2,726,985
Patented Dec. 13, 1955

2,726,985

CONTROLLED ENZYMATIC SYNTHESIS OF DEXTRAN

Nison N. Hellman and Henry M. Tsuchiya, Peoria, Seymour Peter Rogovin, Pekin, and Richard W. Jackson and Frederic R. Senti, Peoria, Ill., assignors to the United States of America as represented by the Secretary of Agriculture No Drawing. Application September 17, 1954, Serial No. 456,892

2 Claims. (Cl. 195—31)

(Granted under Title 35, U. S. Code (1952), sec. 266)

A non-exclusive, irrevocable, royalty-free license in the invention herein described, for all governmental purposes, with power to grant sublicenses for such purposes, is hereby granted to the Government of the United States of America.

This invention relates to the enzymatic synthesis of dextran having predetermined molecular weight characteristics. It relates more particularly to the enzymatic synthesis of dextran having a designated molecular weight range, such as that suitable for clinical use, and relates further to a cyclic process involving a plurality of interrelated steps affording increased yields and various economies of operation. The process is characterized principally by the utilization of certain by-products of the enzymatic synthesis step as starting material for further synthesis steps.

The art has recently become familiar with the enzymatic synthesis of dextran wherein dextransucrase is permitted to act in an aqueous system containing relatively low-molecular-weight polyglucose molecules together with sucrose. According to the prior processes of enzymatic synthesis it is possible to produce dextran of predetermined molecular weight by operating as above under controlled conditions of pH, relative reactant concentrations, and time. By varying these factors one may produce as a major product, for example, dextran having clinically useful molecular weight (75,000+25,000). One of the essentials of the prior enzymatic synthesis process which distinguishes it from previous dextran synthesis is the use of the polyglucose "primer" material. For primer material a variety of polyglucose and polyglucose derivative materials have been suggested, among which are low-molecular-weight dextrans.

We have found that the enzymatic synthesis of dextran of predetermined molecular weight range, produces two polysaccharide by-products. These two by-products are, respectively, the "tails" and the "heads" of the precipitation of the final synthesis product by the fractionating agent. The "tails" comprises a low-molecular-weight dextran which remains in solution during and after the alcohol separation of the desired product. The "heads" comprise relatively high-molecular-weight dextran which is precipitated by alcohol prior to the alcohol precipitation of the desired product.

We have established that the tails from the enzymatic synthesis constitute a suitable primer material for subsequent enzymatic syntheses. Experimentation has shown that the tails may be recycled to subsequent syntheses steps, being usable not only in admixture with specially prepared primer material but also usable per se without appreciable change in the molecular weight characteristics of the final synthesis product.

We have further discovered that the recycling of the tails as primer material in an indefinite number of synthesis cycles, does not provide adequate primer in the majority of cases. This renders it necessary to supplement the tails with other primer material. We have done this using specially prepared primer material such as maltodextran and the like, and in this way can maintain an indefinite series of steps.

The supplementation of the recycled tails involves technical difficulties, however. For example, special equipment is required for the preparation of the supplementary primer. The exact quantity of primer necessary for proper supplementation is not easily predetermined, inasmuch as the character of the desired product depends heavily upon maintenance of the proper concentration ratio of sucrose to primer in the synthesis reaction mixture. It is frequently difficult to operate the two systems at the required cooperating rates.

We have further discovered that the heads fraction of the synthesis step may be utilized to supply the required supplementation, and that by doing so a number of unforeseen advantages are realized. The flexibility of the process is increased markedly. The hydrolyzed, heads may be used without prior fractionation of any kind. By recycling the tails and the hydrolyzed "heads" we are able to realize practically complete technical conversion of sucrose to dextran of predetermined molecular weight characteristics, for all the polysaccharide by-products of the synthesis step are ultimately used and appear in the final product.

The flexibility of the process, when operating as above is remarkable for several reasons. First, the course of the conversion may be steered within very accurate limits simply by controlling the degree of hydrolysis of the heads. A greater or less degree of hydrolysis exerts a control on the relative quantities of heads and tails in the conversion reaction mixture. Thus the amounts of heads may be decreased and the tails consequently increased by carrying out to a greater degree the hydrolysis of the heads from the previous mixture. It will be noted, however, that the amount of heads may not be decreased beyond a certain irreducible minimum, approximately 5 percent of the reaction sucrose for a reaction conducted at 15° C. This is due to the characteristic general distribution of molecular weight in this kind of system. Conversely, a lesser degree of hydrolysis results in an increase in the proportion of heads with respect to tails in subsequent shynthesis reaction mixtures.

The following examples illustrate the practice of the invention. The data and procedure given in these examples are for the purposes of illustration, it being understood that numerous variations and modifications may be made in accordance with the principle of the invention. For example, the desired intermediate molecular weight product produced in these examples is that previously remarked upon. Nevertheless, the procedure may be altered by suitable obvious modifications of synthesis conditions fractionation procedure so that the desired product may have a different predetermined molecular weight character. Furthermore, the procedure may also be varied as to reaction times, temperatures, reactant concentrations and the like so as to fit the needs of expediency and equipment without departing from the principle of the invention.

EXAMPLE I

The example illustrates the use of the low-molecular-weight fraction as a primer material in the enzymatic synthesis of intermediate-molecular-weight dextran. This tails material was obtained from a previously conducted maltose-primed synthesis of dextran obtained by precipitation of the tails between 51 percent and 60 percent methanol. This tails primer material had a weight-average molecular weight of 13,100.

Aqueous reaction mixtures were made up containing 40 dextransucrase units per ml. and various concentrations of primer. Then enzyme had been prepared from *Leuconostoc mesenteroides* NRRL B512 cultures. To these was added solid sucrose to a concentration of 10 percent, and the mixtures permitted to react at 16° C. for 16–24 hours in order to attain complete conversion of sucrose to dextran. The end point was indicated by reducing value determinations, which were slightly in excess of theory at the end of the reaction period. Dextrans was then precipitated by making the reaction mixture to 60 percent v./v. methanol. The precipitated dextran was then made up in 5 percent aqueous solution and fractionated by the progressive addition of methanol. Three different series of fractionations were carried out, varying the methanol concentration ranges. The weight-average molecular weight of the intermediate and low-molecular-weight fractions was determined. The results of the series of experiments are shown in Table I.

17,200 were compared when employed in the reactions at 1 percent and 2 percent concentrations. The conditions of reaction were the same as those of Example I, and the results are summarized in Table II.

Table II:—*Influence of primer molecular weight on the yield and molecular weight of fractions*

| Primer Concentration, Percent | Methanol Fractionation Limits, Percent v./v. | Products from Syntheses Conducted with Primer of Molecular Weight | | | |
|---|---|---|---|---|---|
| | | 13,100 | | 17,600 | |
| | | Yield, Percent | Mol. Wt. | Yield, Percent | Mol. Wt. |
| 1 | 0–42 | 15.5 | ------ | 30.4 | ------ |
| | 42–50 | 20.1 | 65,100 | 13.2 | 62,800 |
| | 50–60 | 8.3 | 19,600 | 3.0 | 24,000 |
| 2 | 0–40 | 6.2 | ------ | 13.0 | ------ |
| | 40–48 | 28.9 | 65,800 | 33.2 | 86,800 |
| | 48–60 | 21.7 | 17,500 | 11.8 | 22,300 |

It may be seen that the higher molecular-weight primer yields higher molecular weight products, that the tails are less in amount that the primer originally used and Table I.—*Influence of dextran-primer concentration and fractionation conditions on the yield and molecular weight of fractions*

| | Products from Syntheses[a] conducted at a primer concentration of— | | | | | |
|---|---|---|---|---|---|---|
| | 1% | | 2% | | 4% | |
| | Yield,[b] Percent | Mol. Wt. | Yield,[b] Percent | Mol. Wt. | Yield,[b] Percent | Mol. Wt. |
| Overall-all precipitation of dextran at 60% Methanol | 44.5 | ------ | 57.8 | ------ | 69.8 | ------ |
| Fractionation I: | | | | | | |
| 0–40% Methanol | 9.8 | ------ | 7.0 | ------ | 25.0 | ------ |
| 40–48% Methanol | 23.1 | 126,000 | 25.1 | 76,000 | 7.4 | 82,600 |
| 48–60% Methanol | 10.7 | 31,100 | 23.3 | 27,800 | 34.5 | 18,400 |
| Fractionation II: | | | | | | |
| 0–41% Methanol | 13.2 | ------ | 8.0 | ------ | 27.0 | ------ |
| 41–49% Methanol | 21.6 | 91,400 | 29.5 | 57,800 | 7.4 | 55,000 |
| 49–60% Methanol | 9.1 | 22,300 | 17.5 | 25,000 | 30.4 | 19,400 |
| Fractionation III: | | | | | | |
| 0–42% Methanol | 15.1 | ------ | 8.9 | ------ | 28.5 | ------ |
| 42–50% Methanol | 20.0 | 76,300 | 31.7 | 65,000 | 10.6 | 39,700 |
| 50–60% Methanol | 8.3 | 24,400 | 16.5 | 17,200 | 26.3 | 19,100 |

[a] Reaction conditions: sucrose concentration, 10%; molecular weight of primer, 13,000; enzyme concentration, 40 dextransucrase units per ml.; temperature, 16° C.
[b] Yield expressed as percentage of reaction sucrose weight.

It is seen from the foregoing that only in two instances (Fractionation I, 1 percent and 2 percent primer) was sufficient dextran recovered in the low-molecular-weight fraction to replace the primer supplied to the reaction. Moreover, in both of these instances the molecular weight of this fraction was more than twice that of the dextran primer used. In all cases, a substantial increase was observed in the average molecular weight of the low-molecular-weight fraction over that of the original primer.

EXAMPLE II

This example illustrates the effect of increasing the molecular weight of the tails primer at constant concentration. As will be seen, it is to increase the weight of the synthesized dextran. Although over a limited range of primer molecular weight, the synthesized dextran may be fractionated to give material of equal molecular weight, the average molecular weight of the total dextran product will depend primarily upon the arithmetical product of the primer molecular weight and the ratio of primer and sucrose concentrations. In a series of experiments, primers of molecular weight 13,100 and that these tails are greater in molecular weight. The findings of Examples I and II confirm that the tails produced in an enzymic synthesis of dextran of intermediate molecular weight are not sufficient in amount to provide primer for recycling in a continuous system.

EXAMPLE III

This example illustrates the synthesis of dextran of intermediate-molecular-weight by a reaction primed with a composite of recycled tails and hydrolyzed heads.

In a cyclic type synthesis, utilizing recycled tails as primer, additional primer material was obtained by hydrolyzing the "heads." We have found by experience that the hydrolyzates may be used without prior fractionation, though such prior fractionation may be carried out as may be indicated by commercial prudence governing any particular set of circumstances. Such prior fractionation does not appear to alter the effect of the use of the hydrolyzate as primer, inasmuch as the higher molecular-weight material fractionated out seems otherwise merely to reappear as such in the synthesis product.

Hydrolysis was carried out with dilute sulfuric acid. The hydrolyzates are characterized in Table III.

Table III.—Characterizations of acid-hydrolyzed dextrans used as primers

| Parent Dextran | Sample No. | Relative Viscosity of 5% Solution | Molecular Weight | Inherent Viscosity |
|---|---|---|---|---|
| High-mol.-wt. fraction | 15 | 2.69 | 38,400 | 0.206 |
|  | 14 | 2.35 | 32,500 | .188 |
|  | 16 | 2.15 | 27,400 | .180 |

The degree of hydrolysis of the heads will vary in accordance with the specific needs of the composite primer, as will be explained below. However, we have found that it should be such that the weight-average molecular weight of the hydrolyzate measured by light scattering of dissymmetry free solutions falls within the range of 20,000 to 50,000. These hydrolyzates were admixed with recycle tails to make up a composite primer, and a dextran synthesis carried out under the reaction conditions of the foregoing examples. The results are given in Table IV.

feature is of great importance in the present invention, for it shows that subsequent hydrolysis of these heads may be controlled in degree to provide one component of a composite primer which will tend to furnish a compensating effect upon the next synthesis. Thus, compositing with a hydrolyzate of around 20,000 molecular weight with recycle tails will tend to decrease the heads fraction of the subsequent synthesis and throw more of the dextran into the middle fraction. On the other hand, in case the conditions were the reverse, i. e. the heads fraction of the previous synthesis should happen to be small in amount and the total product be generally low in molecular weight, this could be compensated for in the subsequent synthesis by hydrolyzing the heads to a molecular weight of about 50,000. Then in the subsequent synthesis the effect of the composite primer would be to press the molecular weight and bulk of the product toward the desired middle fraction range. In any case, we have found that the effect of the molecular weight of the hydrolyzed heads is of sufficient moment in the composite primers to provide a means for controlling the synthesis itself. This is true in spite of its rather wide variation in molecular weight, the specific effect of which is minimized by the uniform priming effect of the re- Table IV.—Utilization of dextran hydrolyzate, low-molecular-weight fraction composite as primer for dextran synthesis

|  | Yield, Percent of Reaction Sucrose | | | | Middle Mol. Wt. | Fractionation of Middle Fraction | | | |
|---|---|---|---|---|---|---|---|---|---|
|  | Total Dextran | High Mol. Wt. | Middle Mol. Wt. | Low Mol. Wt. |  | Low Mol. Wt. | | High Mol. Wt. | |
|  |  |  |  |  |  | Yield, Percent | Mol. Wt. | Yield, Percent | Mol. Wt. |
| Fractionation I [b]: |  |  |  |  |  |  |  |  |  |
| Composite A [c] | 59.0 | 30.8 | 18.1 | 10.0 | 44,000 |  |  |  |  |
| Composite B [c] | 56.0 | 23.3 | 23.8 | 9.0 | 43,000 |  |  |  |  |
| Composite C [c] | 59.2 | 11.7 | 32.1 | 11.2 | 75,000 | 8.8 | 22,500 | 7.5 | 245,000 |
| Fractionation II [b]: |  |  |  |  |  |  |  |  |  |
| Composite A [c] | 63.2 | 27.1 | 19.2 | 15.3 | 60,000 | 8.1 | 25,600 | 11.9 | 84,700 |
| Composite B [c] | 59.2 | 20.3 | 23.2 | 15.3 | 59,500 | 7.9 | 25,000 | 5.7 | 109,000 |
| Composite C [c] | 63.5 | 17.4 | 28.7 | 16.9 | 73,500 | 6.7 | 24,300 | 6.6 | 145,000 |

[a] Reaction conditions: sucrose concentration, 10%; primer, 2%; enzyme concentration, 40 dextransucrase units per ml.; temperature, 16° C.
[b] For fractionation I, total dextran precipitated at 60% methanol from the reaction mixture was progressively precipitated at 42, 50, and 60% methanol. For fractionation II, total dextran precipitated at 60% methanol from the reaction mixture was first progressively precipitated at 40, 48, and 60% methanol and then the 40-48% methanol precipitated fraction was reprecipitated at 41, 49, and 60% methanol. Because of alcohol carryover in precipitates, true alcohol concentrations in this fractionation were approximately 42, 50, and 61 or 62%.
[c] Composite A=50% hydrolyzate no. 15+50% fraction mol. wt. 16,500; composite mol. wt. 27,450; Composite B= 50% hydrolyzate no. 14+50% fraction mol. wt. 16,500; composite mol. wt. 24,500; Composite C=50% hydrolyzate no. 16+50% fraction mol. wt. 16,500; composite mol. wt. 21,950.

Separation of dextran into fractions of lowest and highest molecular weight was carried out in accordance with United States Army Military medical purchase description No. 1 Stock No. 1–161–890 (1951).

It may be seen from the foregoing table that the molecular weight of the middle or desired fraction and the amount of tails may be controlled within close limits by the use of a primer composed of recycled tails and hydrolyzed heads. It may also be seen that Fractionation II yielded a middle fraction of more suitably uniform molecular weight even though the yields in both fractions were approximately equal. For composite primer C, both fractionation procedures yielded middle fractions of very nearly the same molecular weight. Separation of the subfractions of highest and lowest molecular weight from the middle fraction, however, revealed that the two-step fractionation procedure (Fractionation II) yielded a narrow range of molecular weight distribution.

It will be seen from the foregoing table that the net effect of the molecular weight of the primer cannot be adequately evaluated solely from the molecular weights of the middle fractions. It is necessary to consider both yield and molecular weight. Thus, with increasing molecular weight of the composite primer and yield of the high-molecular-weight fraction or heads increases. This cycle tails. In other words, the hydrolyzed heads can be caused to exert a predominating influence as to gross shifts in molecular weight while at the same time exerting only a minimum influence as to the polydispersity of the product.

In accordance with the invention, it will hence be understood that the enzymatic synthesis of intermediate-molecular-weight dextran may be carried out through a large number of cycles, adding only sucrose to the system and recovering from it the desired product in close to theoretical amount. We have operated such a system through a plurality of such cycles and have realized yields of dextran of intermediate-molecular-weight from a synthesis cycle which approximately equals the net dextran yield.

The proportion of recycle tails to hydrolyzed heads in the composite primer may vary considerably, i. e. from 0.1 to 10, but we prefer to use proportions of about 0.5 to 2. Likewise the concentration of sucrose in the synthesis step may vary over a rather wide range, for example 5 percent to 20 percent, and the dextransucrase may vary from 1 to 200 units per ml. The temperature may likewise vary from 10° C. or lower up to about 30° C. The variations of reactants and conditions will all produce corresponding variations of degree in the results of the process, as will be apparent to those skilled in the art.

The reactants and conditions may be varied to achieve special needs as to final product, economy of time or requirements of installation, personnel or equipment, without departing from the principle of this invention.

We claim:

1. In a cyclic method for the production of dextran of intermediate-molecular-weight comprising the synthesis step of reacting an essentially cell-free solution containing dextransucrase, sucrose and a dextran primer comprising a relatively low-molecular-weight dextran, the improvement comprising fractionating the product of said synthesis step into a high-molecular-weight heads fraction, an intermediate-molecular-weight middle fraction and a low-molecular-weight tails fraction, hydrolyzing said heads fraction to a weight-average molecular weight in the range of 20,000 to 50,000, admixing said hydrolyzed heads with said tails fraction and recycling the mixture as dextran primer to a subsequent synthesis step.

2. The method comprising reacting in aqueous solution sucrose, dextransucrase and a primer comprising dextran of molecular weight in the range of 10,000 to 50,000 the concentration of sucrose being in the range of 5 percent to 20 percent, the concentration of dextransucrase being from 1 to 200 units per ml. and the concentration of primer being from 1 to 4 percent, permitting the reaction to go to completoin as evidenced by the subsfantial disappearance of sucrose from the system, separating the dextran product and fractionating it into a heads fraction of high-molecular-weight, a middle fraction of intermediate-molecular-weight, and a tails fraction of low-molecular-weight, hydrolyzing the heads fraction to a weight-average molecular weight of 20,000 to 50,000, admixing said hydrolyzed heads fraction with said tails fraction and recycling the resulting mixture as primer for a subsequent synthesis step.

References Cited in the file of this patent

UNITED STATES PATENTS 2,660,551     Koepsell et al.  ---------- Nov. 24, 1953

OTHER REFERENCES

Tsuchiya et al.: Jour. Am. Chem. Soc., February 5, 1953, pages 757–758.

Koepsell et al.: Jour. Biol. Chem. 200 (1953), pages 793–801.